United States Patent [19]
Bronfeld et al.

[11] Patent Number: 5,847,956
[45] Date of Patent: Dec. 8, 1998

[54] AUTOMATIC TRIMMING OF GEOMETRIC OBJECTS IN CAD/CAM SYSTEMS

[75] Inventors: Jason P. Bronfeld, Belmont; Peter Revelas, Westford, both of Mass.

[73] Assignee: Computervision Corporation, Bedford, Mass.

[21] Appl. No.: 721,180

[22] Filed: Sep. 26, 1996

[51] Int. Cl.$^6$ .................................................. G06F 19/00
[52] U.S. Cl. ................ 364/468.04; 345/420; 364/974.24
[58] Field of Search ......................... 364/468.03, 468.04, 364/474.24, 474.05, 474.2, 474.29; 345/419, 420, 421, 422, 434, 441, 442, 964, 965

[56] References Cited

U.S. PATENT DOCUMENTS

| | | | |
|---|---|---|---|
| 4,618,924 | 10/1986 | Hinds .............................. | 364/474.25 X |
| 4,736,306 | 4/1988 | Christensen et al. .......... | 364/474.24 X |
| 4,837,703 | 6/1989 | Kakazu et al. .................. | 364/474.25 X |
| 4,868,761 | 9/1989 | Hayashi ............................. | 364/474.24 |
| 4,989,152 | 1/1991 | Cheng ................................ | 364/474.24 |
| 5,010,502 | 4/1991 | Diebel et al. ....................... | 364/474.24 |
| 5,353,389 | 10/1994 | Fiasconaro ............................... | 345/419 |

OTHER PUBLICATIONS

"3D Home Architect, Edition 2" (as early as Dec. 30, 1996).
"SolidWorks 96" Brochure (as early as Dec. 3, 1996).
Intergraph Imagineer Brochure, Sep. 1996.
Intergraph Imagineer Fact Sheet, Oct. 1996.
D. Serrano and D. Gossard, "Constraint Management in MCAE," Third International Conference on Applications of Artificial Intelligence in Engineering, Aug. 8–12, 1988, Los Angeles, CA.

J. Hopcroft and R. Karp, "Ann$^{52}$ Algorithm for Maximum Matchings in Bipartite Graphs*," Siam J Comput, vol. 2, No. 4, Dec. 1973.

R. Tarjan, "Depth–First Search and Linear Graph Algorithms*", Siam J Comput, vol. 1, No. 2, Jun. 1972.

D. Serrano and D. Gossard, "Constraint Management in Conceptual Design," Applications of Artificial Intelligence in Engineering, Aug. 1987, Boston, MA.

J. Stevenson, "Rigid Body Decomposition, A Variation Geometry Solving Technique," First draft May 14, 1994; first revision Mar. 23, 1994, Feb. 17, 1995.

*Primary Examiner*—Joseph Ruggiero
*Attorney, Agent, or Firm*—Wolf, Greenfield & Sacks, PC

[57] ABSTRACT

A method and apparatus for automatically trimming a geometry that is formed by the spatial intersection of geometric model primitives created on a computer aided design (CAD) system. In one embodiment of the present invention, an automatically trimmed representation of the geometry is determined while retaining the geometric model primitives used to determine the automatically trimmed representation. In another embodiment, the automatically trimmed representation is determined based upon a concept of sense that can be assigned to each model primitive, or inferred for each model primitive. In a further embodiment, the automatically trimmed representation is determined based upon a boolean evaluation of the spatial intersection of the geometric model primitives.

69 Claims, 12 Drawing Sheets

AUTOMATIC TRIMMING OF GEOMETRIC OBJECTS IN CAD/CAM SYSTEMS

BACKGROUND OF THE INVENTION

1. Field of the Invention

The present invention relates to multi-dimensional modeling of solids in computer aided design and computer aided manufacturing (CAD/CAM) systems. More particularly, the present invention relates to automatic trimming of two-dimensional (2D) geometric primitives that interact to form complex geometries used to model multi-dimensional solids in CAD/CAM systems.

2. Discussion of the Related Art

In a typical CAD/CAM system, a user interacts with the system to design a multi-dimensional model that can later be used to manufacture a product according to the specifications of the model. During the design process, the user creates or sketches parts of the model on the computer system's display using various 2D geometric primitives such as lines, arcs, circles, rectangles, etc. The user specifies the interaction of the various 2D geometric primitives to form more complex geometries, that, in turn, interact to define the object being designed.

Early CAD/CAM systems supported only simple geometric primitives such as lines and arcs. Hence, to create a more complex geometry such as a rectangle, a user was required to sketch a first pair of parallel lines that intersected with a second, and then to manually trim each of the endpoints of the lines to form the corners of the rectangle. Trimming for this example would involve manually moving the endpoint of each line back to the appropriate corner.

Although modern CAD/CAM systems now support more complex geometric primitives such as rectangles and other polygons, manual trimming is still necessary to create geometries that are more complex than those available in a geometric primitive library of the CAD/CAM system. For example, for a user of a conventional CAD/CAM system to create the geometry 9 illustrated in FIG. 1a, the user could begin by creating rectangle 1 and circle 2, as shown in FIG. 1b. The user could then trim primitives 1 and 2 by manually removing arc ADC of circle 2 and segment AC of rectangle 1 to form the geometry 9. Alternatively, as shown in FIG. 1c, the user could create rectangle 1 in combination with either an arc ABC if the CAD/CAM system supports arcs up to 180°, or a pair of arcs AB and BC if 180° arcs are not supported. In either case, the user could then trim the model by removing the segment AC from rectangle 1 to complete the formation of the geometry 9.

Some CAD/CAM systems include boolean operation evaluators that operate on geometries and can be used to assist in trimming a model. Although boolean operation evaluators are capable of performing three-dimensional (3D) boolean evaluations on 3D geometries, they may also be used to perform 2D boolean evaluations on 2D geometries. For example, in using such a system to create the geometry 9 of FIG. 1a, a user could create rectangle 1 and circle 2, and then execute a command that causes the boolean operation evaluator to perform a 2D union of these geometric primitives.

Using any of the above-described manual techniques, trimming on a conventional CAD/CAM system involves the execution of at least one additional trimming step, in addition to the creation and placement of the geometric primitives that are used to form the higher level portion of the model. Furthermore, the manual trimming operations performed on conventional CAD/CAM systems suffer from another significant disadvantage in that once the user has trimmed one or more geometric primitives to create a more complex geometry, the underlying primitives that were used prior to the trimming operation are destroyed, and the complex geometry is formed solely by the inter-connection of low-level primitives (e.g., lines and arcs). As a result, subsequent modifications can require significant additional trimming steps that in some instances are so complex, it is more efficient for the user to delete the geometry and start anew.

For example, if a user of a conventional CAD/CAM system desired to modify the geometry 9 of FIG. 1a by moving the arc ABC left to the position of arc A'B'C' in FIG. 1d, a number of trimming steps would be required. The user would move arc ABC to the left to create the arc A'B'C', then move the position of the endpoint A of segment EA to position A', and finally move the position of endpoint C of segment CF to position C'. Alternatively, the user might find it more efficient to simply delete the geometry 9 and start anew by creating another rectangle and circle, and trimming them as described above in connection with the formation of the geometry 9 in FIG. 1a. However, whichever manual trimming operation the user chooses, it should be appreciated that the execution of a number of commands would be required.

SUMMARY OF THE INVENTION

In accordance with one illustrative embodiment of the present invention, a method and apparatus is provided for automatically trimming a geometry that results from the spatial intersection of two or more geometric primitives in a design. Thus, when a geometric primitive is added to the design, an automatic representation of that primitive's spatial interaction with other geometric primitives in the design is determined and can be displayed. In a further embodiment of the present invention, the automatic representation of the added geometric primitive's interaction with other geometric primitives in the design is displayed in a solid line form, along with a dotted line representation of the geometric primitives that form the design.

In another illustrative embodiment of the present invention, geometric primitives are assigned an attribute, called sense, that facilitates the automatic trimming of their spacial interaction and uniquely determines their automatically trimmed representation in the design. In a further embodiment of the present invention, the CAD/CAM system infers the attribute of sense from a plurality of user actions, including those taken in creating and placing a geometric primitive in the design. In a still further embodiment of the present invention, the CAD/CAM system infers the attribute of sense from other software sources of the CAD/CAM system.

In another embodiment of the present invention, the automatic trimming of the spatial interaction of a plurality of geometric primitives that interact to form a design is based upon the order of creation of the geometric primitives. In a further embodiment of the present invention, the automatic trimming of the spacial interaction of the plurality of geometric primitives that interact to form the design is independent of the order of creation of the geometric primitives. In a still further embodiment of the present invention, the automatic trimming of the spatial interaction of two selected geometric primitives that interact to form the design can be selectively dissociated from one another without affecting the automatically trimmed representation of other geometric primitives in the design.

In another embodiment of the present invention, a method and apparatus is provided for retaining the operands (e.g., the geometric primitives) used to perform automatic trimming of the spatial interaction of a plurality of geometric primitives that form the design. In a further embodiment of the present invention, the operands used to perform the automatic trimming of the spatial interaction of the plurality of geometric primitives that form the design can be modified to determine a new automatically trimmed representation of the design. In a still further embodiment of the present invention, changes in the operands that are used to perform automatic trimming automatically determine a new trimmed representation of that design based on the modified operands.

In another embodiment of the present invention, a method and apparatus is provided for automatically trimming the spatial interaction of a plurality of geometric primitives that form a design based upon a boolean evaluation of the plurality of geometric primitives.

BRIEF DESCRIPTION OF THE DRAWINGS

Illustrative embodiments of the present invention will be described by way of example with reference to the accompanying drawings, in which.

DETAILED DESCRIPTION

In one embodiment of the present invention, a method and apparatus is provided for automatically trimming geometric primitives in a CAD/CAM system to form more complex geometries. This embodiment can be implemented via an automatic trimming code module that runs on the CAD/CAM system and works in conjunction with a 2D sketcher and a display update module to automatically trim 2D geometric primitives when the user adds them to the design.

In another embodiment of the invention, the automatic trimming code module performs trimming without destroying the underlying geometric primitives that were used to create the more complex geometry. In addition to displaying the trimmed complex geometry on the CAD/CAM system's display, the present invention can also display the underlying 2D geometric primitives so that they can be manipulated by the user. In one embodiment of the invention, the trimmed geometry is displayed in solid line form while the underlying primitives are displayed in dotted line, with the automatically trimmed representation being superimposed over the underlying 2D geometric primitives. However, it should be understood that numerous alternative display schemes are possible.

Figure 2A:
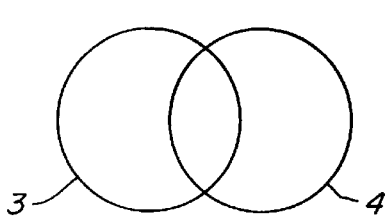
FIGS. 2a–2d illustrate 2D geometries that can be formed by different 2D boolean evaluations of two geometric primitives.
Figure 2B:
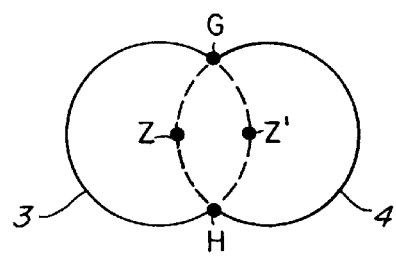
Figure 2C:
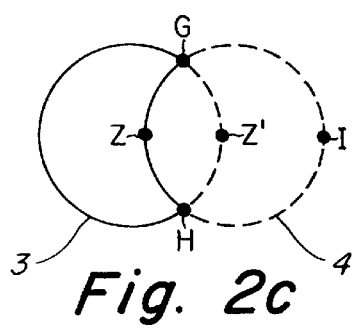
Figure 2D:
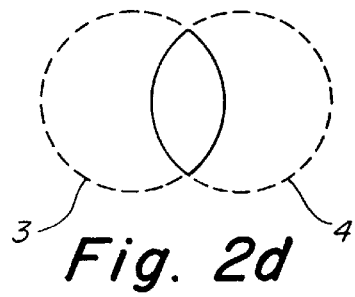

As discussed above, CAD/CAM systems typically include a boolean operation evaluator that can perform 2D boolean evaluations on geometric primitives. The types of 2D evaluations that the boolean evaluators can perform include forming the union of two or more geometric primitives, the subtraction of one or more geometric primitives from another, and the intersection of two or more geometric primitives. Examples of these operations are shown in FIGS. 2b–2d, respectively. FIG. 2a shows two overlapping circles 3 and 4 that can be created by a user. The 2D boolean union of these circles is illustrated in solid line form in FIG. 2b, with the underlying circles being shown in dotted line. The result of a 2D subtraction of circle 4 from circle 3 is shown in the same manner in FIG. 2c, and the 2D intersection of the two circles is shown in FIG. 2d.

Figure 1A:
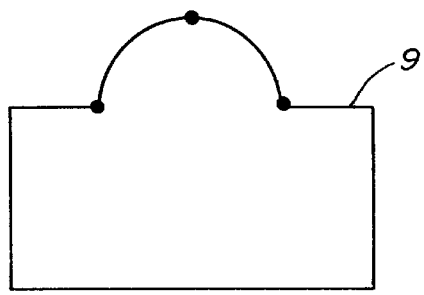
FIGS. 1a–1d illustrate a 2D geometry that can be formed by the interaction and subsequent trimming of several geometric primitives.
Figure 1B:
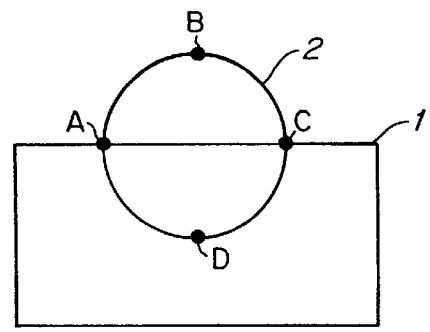
Figure 1C:
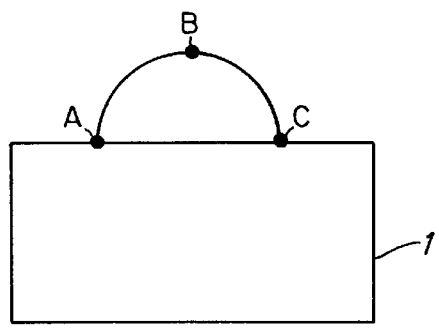
Figure 1D:
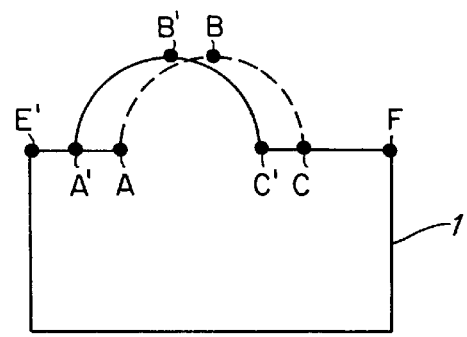

In one embodiment of the invention, the boolean operation evaluator of a CAD/CAM system is used to perform automatic trimming. When combined with the preservation of the underlying geometries, the use of the boolean evaluator provides a powerful tool that makes explicit trimming operations obsolete. Referring to the example of FIGS. 1a–1d discussed above, it can be seen that the geometry 9 of FIG. 1a can be created by forming a 2D boolean union of the rectangle 1 and circle 2, which trims the circle and rectangle in the desired manner. As discussed below, in one embodiment of the invention this trimming is done automatically, without requiring the execution of a trimming command. Furthermore, because the underlying geometric primitives (e.g., the circle 2 and rectangle 1) are maintained, it is extremely easy for the user to modify the trimmed geometry 9 to achieve the result shown in FIG. 1d. Specifically, all that is required is that the user move circle 2 to the left so that rather than intersecting the rectangle at points A and C, it does so at points A' and C'. The 2D boolean union of the circle 2 and rectangle 1 then automatically trims the design to form the desired geometry.

In one embodiment of the invention, automatic trimming using the boolean operation evaluator is facilitated by assigning each closed planar geometric primitive (e.g., a rectangle, polygon, circle, slot, etc.) in the design a sense, which can be positive, negative or neutral. Geometric primitives having positive sense can be conceptualized as defining the boundaries of solids (e.g., a 2D face of a 3D solid), whereas geometric primitives having negative sense can be conceptualized as defining the boundaries of holes, slots, grooves, etc. in a face of a solid. A geometric primitive having a neutral sense indicates that it does not interact with any other geometric primitive in the 2D sketch, which is useful for reasons described below. The sense of each geometric primitive can be individually set by the user. In one embodiment of the invention, geometric primitives added to a design default to positive sense unless the user specifies a different default setting.

One embodiment of the present invention is adapted for use with a CAD/CAM system that is written in an object-oriented computer language. In this embodiment, each geometric primitive is defined by a geometry object having a unique identifier and various attributes that include the sense of the primitive. It should be understood that the present invention is not limited to use with a CAD/CAM system written in an object-oriented language, and that a sense can be assigned to each goemetric primitive in a number of other ways.

As mentioned above, the automatic trimming module of the present invention uses the sense of the geometric primitives in conjunction with the capabilities of the CAD/CAM system's boolean operation evaluator to automatically trim complex geometries, without destroying the underlying geometric primitives. For example, when two geometric primitives having positive sense overlap in the 2D plane of the sketch, the automatic trimming module displays the 2D boolean union of the two primitives superimposed over the outline of the underlying geometric primitives. Referring to FIG. 2a, if the geometry objects that define circles 3 and 4 each has a positive sense attribute, the circles can be passed by the automatic trimming module to the boolean evaluator with instructions to perform a 2D union of the circles, and the evaluator would return the result illustrated in FIG. 2b. Thus, the trimming of arc GZH of circle 3 and arc GZ'H of circle 4 is performed automatically, without requiring that any trimming commands be executed by the user. Furthermore, because the automatic trimming module superimposes the trimmed result over the underlying primitives without destroying those primitives, the primitives can be used to automatically trim any subsequent modifications to the design (e.g., increasing the radius of one of the circles).

Referring to FIG. 2c, if the geometry object defining circle 3 had a positive sense but the geometry object defining circle 4 alternatively had a negative sense, the automatic trimming module would pass the circles to the boolean evaluator with an instruction to subtract circle 4 from circle 3. The result that is passed back to the trimming module and displayed over the circles is illustrated in FIG. 2c. In this example, the trimming of arc GZ'H of circle 3 and arc GIH of circle 4 is performed automatically, without destroying the underlying geometries (i.e., circles 3 and 4).

If the geometry object defining one of circles 3 and 4 has a positive sense and the other has a neutral sense, or if both circles 3 and 4 have a neutral sense, the automatic trimming module need not pass the circles to the boolean operation evaluator, and can simply display circles 3 and circle 4 as illustrated in FIG. 2a. The use of neutral sense is useful where two geometric primitives intersect in the 2D plane of the sketcher, but are not intended to interact in a manner that requires trimming. For example, the circles 3 and 4 could be used later to define a pair of cylinders, one that extends back from the 2D plane of the sketch and one that extends forward from the sketch plane, so that the circles need not be trimmed.

It should be recognized that if circles 3 and 4 each has a negative sense, the automatic trimming module need not perform any trimming. Nevertheless, the two circles remain as part of the model and may result in the trimming of positively-sensed primitives that may subsequently be added to the model.

It should be understood that the assignment of a sense to each geometric primitive can present a number of potential solutions for the boolean operation evaluator when a geometric primitive having negative sense interacts in the 2D sketcher plane with two or more primitives having positive sense. This is illustrated in FIGS. 3a–d, wherein circles 5 and 7 each has positive sense and overlaps with a circle 6 having negative sense. It should be appreciated that the trimmed result for these three circles can depend upon the order in which the boolean operations are performed, which is typically determined based upon the order in which the geometric primitives are added to the model.

Figure 3A:
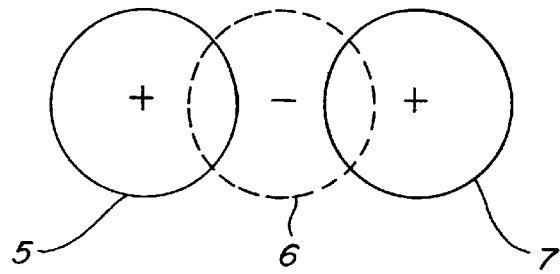
FIGS. 3a–3d illustrate various geometries that can be formed by the interaction of three geometric primitives having a sense, according to an embodiment of the present invention.
Figure 3B:
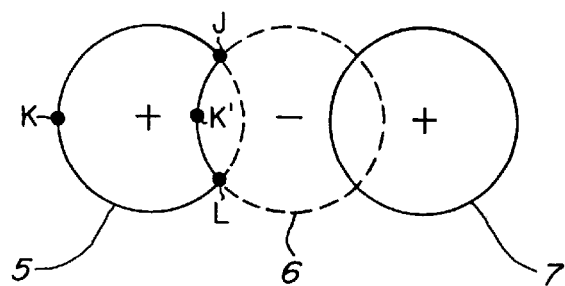

For example, FIG. 3b illustrates the automatically trimmed result obtained by adding circles 5 and 6 first, and then adding circle 7 to the design. The 2D boolean subtraction of circle 6 from circle 5 creates an automatically trimmed geometry JKLK'. Because it does not interact with geometry JKLK', circle 7 remains intact such that the automatically trimmed result would be geometry JKLK' adjacent circle 7, as shown by the solid lines of FIG. 3b.

Figure 3C:
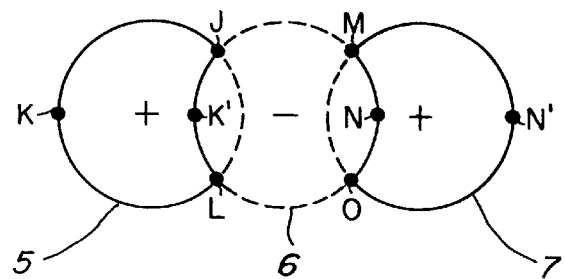
Figure 3D:
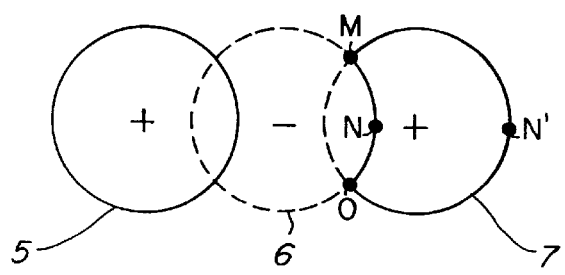

Alternatively, if circles 5 and 7 were added to the model first, and then circle 6 was added to the design, the trimmed result would be the geometries JKLK' and MNON', indicated by the solid lines in FIG. 3c. If circle 7 and circle 6 were added to the model first and then circle 5 was added, the automatically trimmed result would be the geometry MNON' adjacent circle 5, as shown in FIG. 3d.

As should be appreciated from the foregoing, when a primitive having negative sense overlaps two or more primitives of positive sense, there are a number of potential trimmed solutions. In one embodiment of the invention, the automatic trimming module maintains a knowledge of the order in which primitives are added to the model, and interacts a primitive having negative sense only with those primitives having a positive sense that were added to the model before it. In this manner, the auto-trimming module attempts to discern the intent of the user from the order in which primitives are added to the model.

Although the above-described embodiment is useful in that it attempts to discern the intent of the user, it presents the user with some challenges when modifications are made to a complex model. In particular, if primitives are moved about in the model and the user does not recall the order in which the primitives were added, the user cannot be certain as to which primitives will be interacted by the auto-trimming module.

In an alternate embodiment of the invention, a feature is provided so that the interaction of geometric primitives is independent of their order of creation, so that neither the software nor the user is required to remember the creation order. Although the default is that each primitive having a negative sense interacts with all primitives having positive sense that overlap with it in the sketcher plane, the user is provided with the capability of specifying that any two geometric primitives having opposite sense do not interact. This provides a powerful capability to the user to take advantage of the automatic trimming module to achieve the desired model, without requiring that the user retain any knowledge about the order in which the primitives were created. For example, if the result of FIG. 3b was desired, the user could designate circles 6 and 7 as not interacting, and if the result of FIG. 3*d* was desired, circles 5 and 6 could be designated to not interact.

As should be appreciated from the foregoing, the use of sense and the boolean operation evaluator enables the auto-trimming module to automatically trim closed planar geometric primitives that interact in the model. Open planar geometric primitives can be trimmed in a different manner, as described in more detail below.

In one embodiment of the present invention, the automatic trimming module is called by the sketcher whenever a geometric primitive is created, modified or deleted from the model, and is passed the object identifier corresponding to the geometric primitive that has been created, modified or deleted. When the user specifies that the interaction of two selected geometric primitives should be adjusted, the sketcher calls the automatic trimming module and passes it the object identifiers corresponding to the two selected geometric primitives whose interaction is to be altered. The automatic trimming module makes use of the boolean operation evaluator to trim the model in the manner required, updates the display so that the trimmed model is superimposed on the underlying geometric primitives, and returns control to the sketcher. Although the use of the boolean operation evaluator of the CAD/CAM system is advantageous, it should be understood that the present invention is not limited in this respect, and that the auto-trimming module can have its own distinct engine to perform the operations used in trimming the model.

FIGS. 4–7 are flowcharts illustrating exemplary implementations of routines for respectively implementing the automatic trimming module when a geometric primitive is added, deleted and modified, and when the interaction between two primitives is adjusted by the user. It should be understood that each flowchart is provided merely for illustrative purposes, and that numerous other implementations are possible. Furthermore, it should also be recognized that separate routines need not be provided for handling the addition, deletion and modification of geometric primitives and the adjustment of the interaction between any two primitives, and that these functions of the auto-trimming module can be implemented in a single routine.

Figure 4:
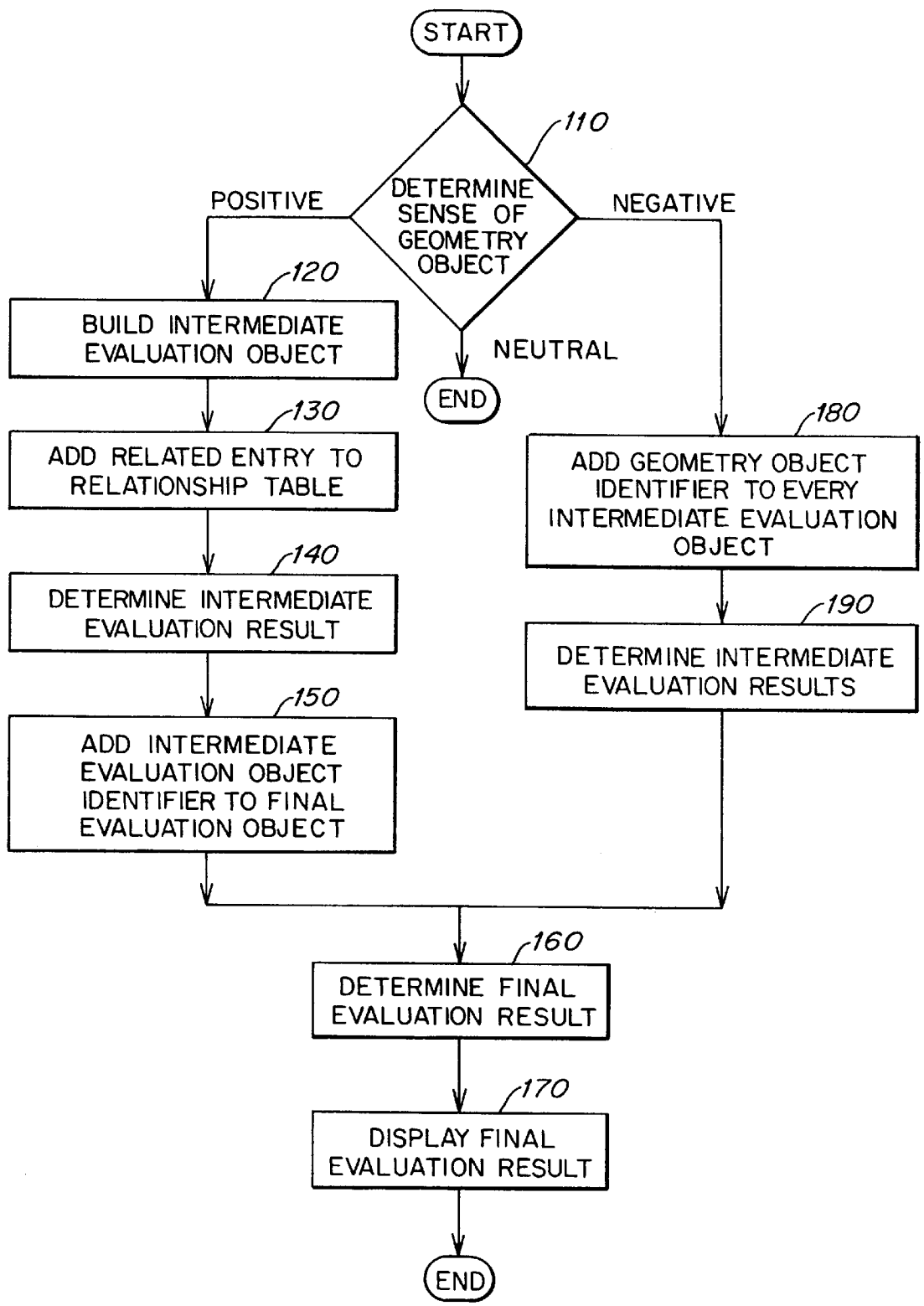
FIG. 4 is a flowchart of a creation routine, according to one embodiment of the present invention that performs automatic trimming on geometric primitives when a geometric primitive is created.

The creation routine of FIG. 4 is called by the sketcher when a geometric primitive is created, and is passed an identifier of the geometry object that defines the created geometric primitive. In step 110, a determination is made as to whether the sense of the created geometric primitive is positive, negative or neutral.

When the sense of the created geometry object is positive, the creation routine proceeds to step 120, wherein an object defining an intermediate evaluation for the added geometric primitive is built. The intermediate evaluation object includes the identifier of the geometry object that defines the geometric primitive, a listing of the identifiers of all geometric primitives in the design that have a negative sense and are currently associated with the added geometric primitive, and a location for storing an evaluation result. At creation, the list of negatively-sensed geometric primitives will include all those in the design. If any negatively-sensed geometric primitives are later dissociated from the positively-sensed geometric primitive, they will be removed from the list as discussed below.

The creation routine then proceeds to step 130, wherein an entry for the added geometric primitive is added to a relationship table. The relationship table contains an entry for each positively-sensed geometric primitive, with the entry including a pointer to the intermediate evaluation object built for that geometric primitive in step 120. It should be understood that rather than using a distinct relationship table, the geometry object that defines each geometric primitive could be updated to include a pointer to the intermediate evaluation object built for that geometric primitive, and that an identifier other than a pointer can be used.

After the entry is added to the relationship table, the routine proceeds to step 140, wherein the boolean operation evaluator is called to determine an intermediate evaluation result for the added geometry object. The creation routine passes to the boolean operation evaluator the identifier of the geometry object that defines the added primitive, as well as the list developed in step 120 of the identifiers of all negatively-sensed geometric primitives that are associated with the positively-sensed geometric primitive whose creation resulted in the calling of the creation routine. The boolean operation evaluator performs a 2D boolean subtraction of all the associated negatively-sensed geometric primitives from the added geometric primitive, and stores the result in the intermediate evaluation object built for the added primitive in step 120.

The routine next proceeds to step 150, wherein an object defining a final evaluation for the model is built if it does not exist from a previous pass through the creation routine. The final evaluation object includes a list of pointers to the identifiers of the intermediate evaluation objects corresponding to all of the positively-sensed geometric primitives in the design, as well as a location for storing a 2D boolean result that is the union of all the intermediate evaluation results in the design, and therefore, is the representation of the total design. If the final evaluation object already exists when the creation routine reaches step 150, the list of pointers to the intermediate evaluation objects is updated to include the intermediate evaluation object newly built in step 120.

The creation routine then proceeds to step 160, wherein the routine calls the boolean operation evaluator and passes to it the list, from the final evaluation object, of the identifiers of all the intermediate evaluation objects in the design. The boolean operation evaluator performs a 2D union of all the intermediate evaluation results in the design, including the intermediate evaluation result newly determined in step 140, and determines a final evaluation result that is stored in the final evaluation object built in step 150. The routine then proceeds to step 170, wherein a display update module is called to display the final evaluation result, and the routine terminates. As discussed above, the final evaluation result is superimposed over the underlying geometric primitives, which are not destroyed by the automatic trimming module.

As should be appreciated from the foregoing, the exemplary creation routine shown in FIG. 4 is advantageous in that when a positively-sensed geometric primitive is added to the design, the entire design need not be recalculated. Rather, the creation routine only determines the intermediate evaluation result corresponding to the created geometric primitive, and then updates the final evaluation result accordingly. Other intermediate evaluation results that reflect the interaction of other positively-sensed primitives and their associated negatively-sensed primitives need not be re-evaluated, thereby saving computation time and resources.

When it is determined at step 110 that the sense of the created geometric primitive is negative, the creation routine proceeds to step 180, wherein an identifier of the object that defines the negatively-sensed primitive is added to every intermediate evaluation object in the design. This is facilitated by the relationship table, which contains an entry relating each positively-sensed geometry object to its corresponding intermediate evaluation object. After each intermediate evaluation object in the design is updated, the creation routine proceeds to step 190, wherein the boolean operation evaluator is called once for each intermediate evaluation object. The routine passes to the boolean operation evaluator the identifier of each positively-sensed geometric primitive and its updated list of associated negatively-sensed geometric primitives. The boolean operation evaluator performs 2D boolean subtractions of all the associated negatively-sensed geometric primitives from each positively-sensed geometric primitive, and stores the results in the corresponding intermediate evaluation objects. After the intermediate evaluation objects are updated, the routine proceeds to steps 160 and 170, wherein the final evaluation for the design is determined and displayed in the manner discussed above.

When the sense of the created geometry object is neutral, the creation routine simply terminates, without perform any steps, because as discussed above, a neutral sense indicates that no trimming operations should be performed on the primitive.

Figure 5:
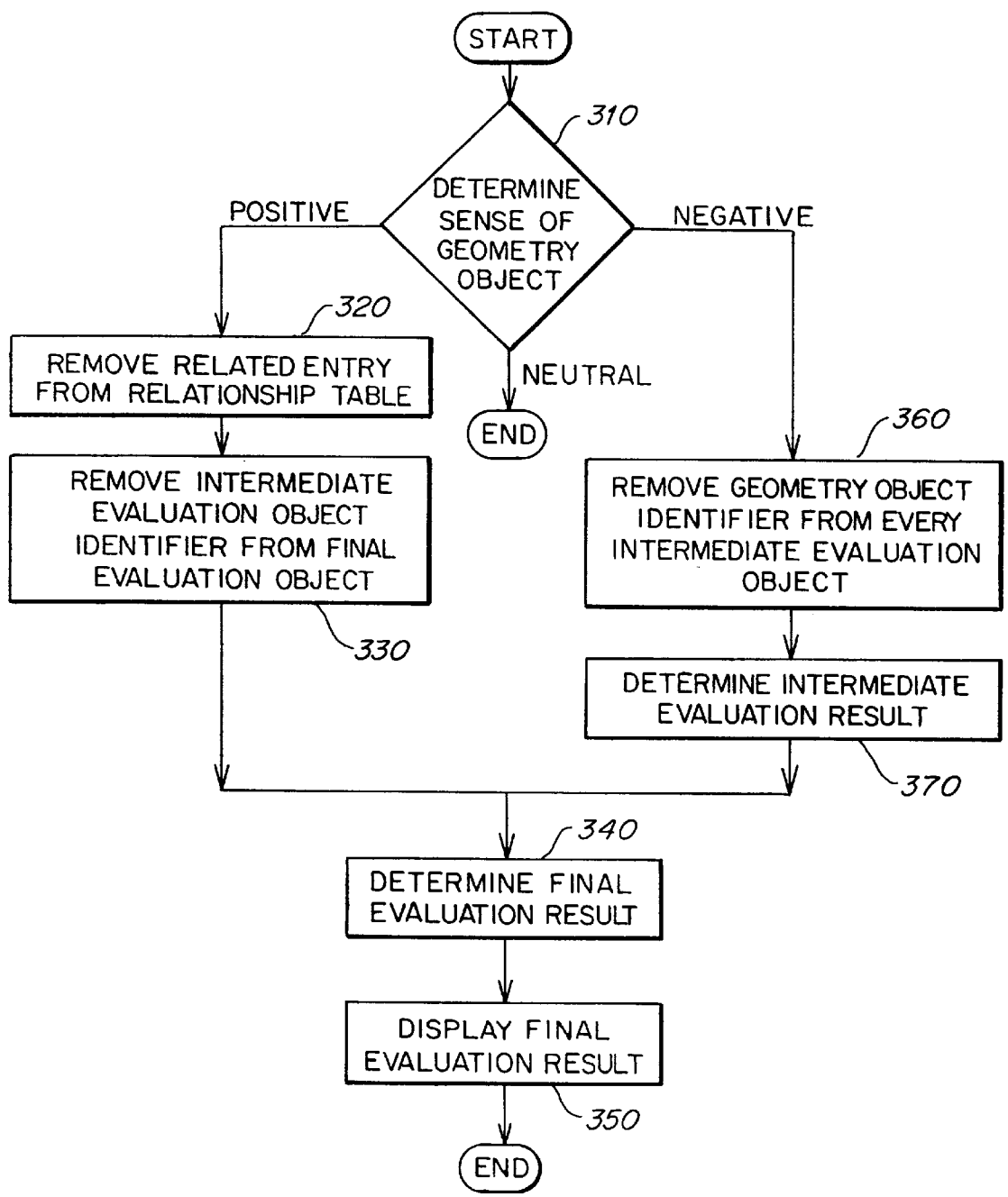
FIG. 5 is a flowchart of a deletion routine, according to another embodiment of the present invention that performs automatic trimming on geometric primitives when a geometric primitive is deleted.

FIG. 5 is a flowchart illustrating one implementation of a deletion routine that is called when a geometric primitive is deleted from the model. The routine is passed an identifier of the geometry object that defines the deleted geometric primitive. In step 310, a determination is made as to whether the sense of the deleted geometric primitive is positive, negative or neutral.

When the sense of the deleted geometric primitive is positive, the deletion routine proceeds to step 320, wherein the entry relating to the deleted geometric primitive is removed from the relationship table. The deletion routine then proceeds to step 330, wherein the identifier of the intermediate evaluation object that had been built in step 120 (FIG.4) when the deleted primitive was created is removed from the final evaluation object. The routine then proceeds to step 340, wherein the routine calls the boolean operation evaluator and passes to it the updated list, from the final evaluation object, of the identifiers of all the intermediate evaluation objects in the design. The boolean operation evaluator performs a 2D union of all the intermediate evaluation results in the design, excluding the intermediate evaluation removed in step 330, and determines a final evaluation result that is stored in the final evaluation object. The routine then proceeds to step 350, wherein the display update module is called to display the final evaluation result, and the routine terminates.

As should be appreciated from the foregoing, the exemplary deletion routine shown in FIG. 5 is advantageous in that when a positively-sensed geometric primitive is deleted from the design, the entire design need not be recalculated. Rather, the deletion routine does not determine any intermediate evaluation results that reflect the interaction of other positively-sensed primitives and their associated negatively-sensed primitives, thereby saving computation time and resources.

When it is determined at step 310 that the sense of the deleted geometry object is negative, the deletion routine proceeds to step 360, wherein the identifier of the negatively-sensed geometric primitive is removed, for each intermediate evaluation object, from its list of associated negatively-sensed primitives. The deletion routine then proceeds to step 370, wherein the boolean operation evaluator is called once for each intermediate evaluation object. The routine passes to the boolean operation evaluator the identifier of each positively-sensed geometric primitive and its updated list of associated negatively-sensed geometric primitives. The boolean operation evaluator performs 2D boolean subtractions of all the associated negatively-sensed geometric primitives from each positively-sensed geometric primitive, and stores the results in the corresponding intermediate evaluation objects. After the intermediate evaluation objects are updated, the routine proceeds to steps 340 and 350, wherein the final evaluation for the design is determined and displayed in the manner discussed above.

When the sense of the created geometry object is neutral, the deletion routine simply terminates, without perform any steps, because as discussed above, a neutral sense indicates that no trimming operations should be performed on the primitive.

Figure 6:
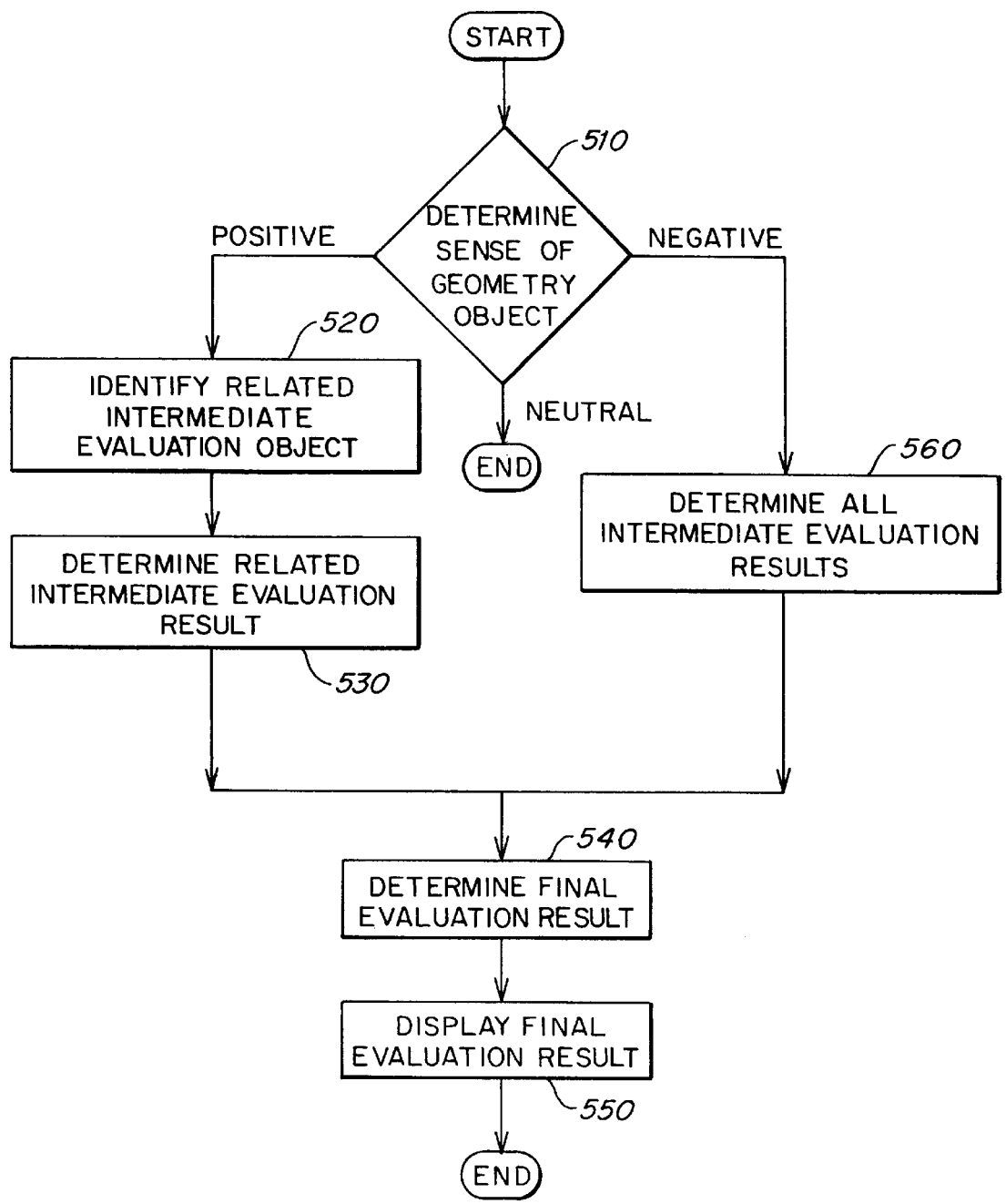
FIG. 6 is a flowchart of a modification routine, according to a further embodiment of the present invention that performs automatic trimming on geometric primitives when a geometric primitive is modified.

FIG. 6 is a flowchart illustrating one implementation of a modification routine that is called when a geometric primitive is modified in the model. Modifications of the geometric primitive can include modification of the position of the geometric primitive in the model, modification of its dimensions, modification of its orientation, etc. When called, the modification routine is passed an identifier of the geometry object that defines the modified geometric primitive. In step 510, a determination is made as to whether the sense of the modified geometric primitive is positive, negative or neutral.

When the sense of the modified geometric primitive is positive, the modification routine proceeds to step 520, wherein the modification routine uses the relationship table to identify the intermediate evaluation object corresponding to the modified geometric primitive. The modification routine then proceeds to step 530, wherein the boolean operation evaluator is called to generate a new intermediate evaluation result corresponding to the modified geometric primitive. The modification routine then proceeds to step 540, wherein the routine calls the boolean operation evaluator and passes to it the list, from the final evaluation object, of the identifiers of all the intermediate evaluation objects in the design, which includes the new result generated in step 530. The boolean operation evaluator performs a 2D union of all the intermediate evaluation results in the design, and determines a final evaluation result that is stored in the final evaluation object. The routine then proceeds to step 550, wherein the display update module is called to display the final evaluation result, and the routine terminates.

As should be appreciated from the foregoing, the exemplary modification routine shown in FIG. 6, like that of FIGS. 4 and 5, is advantageous in that when a positively-sensed geometric primitive is modified in the design, the entire design need not be recalculated. Rather, the modification routine does not determine any intermediate evaluation results that reflect the interaction of other positively-sensed primitives and their associated negatively-senses primitives, thereby saving computation time and resources.

When it is determined at step 510 that the sense of the modified geometry object is negative the modification routine proceeds to step 560, wherein the boolean operation evaluator is called to determine intermediate evaluation results for each of the intermediate evaluation objects in the design, with the results from the boolean operation evaluator being updated in the corresponding intermediate evaluation objects. The modification routine then proceeds to steps 540 and 550, wherein the final evaluation for the design is determined and displayed in the manner discussed above.

When the sense of the created geometry object is neutral, the modification routine simply terminates, without perform any steps, because as discussed above, a neutral sense indicates that no trimming operations should be performed on the primitive.

Figure 7:
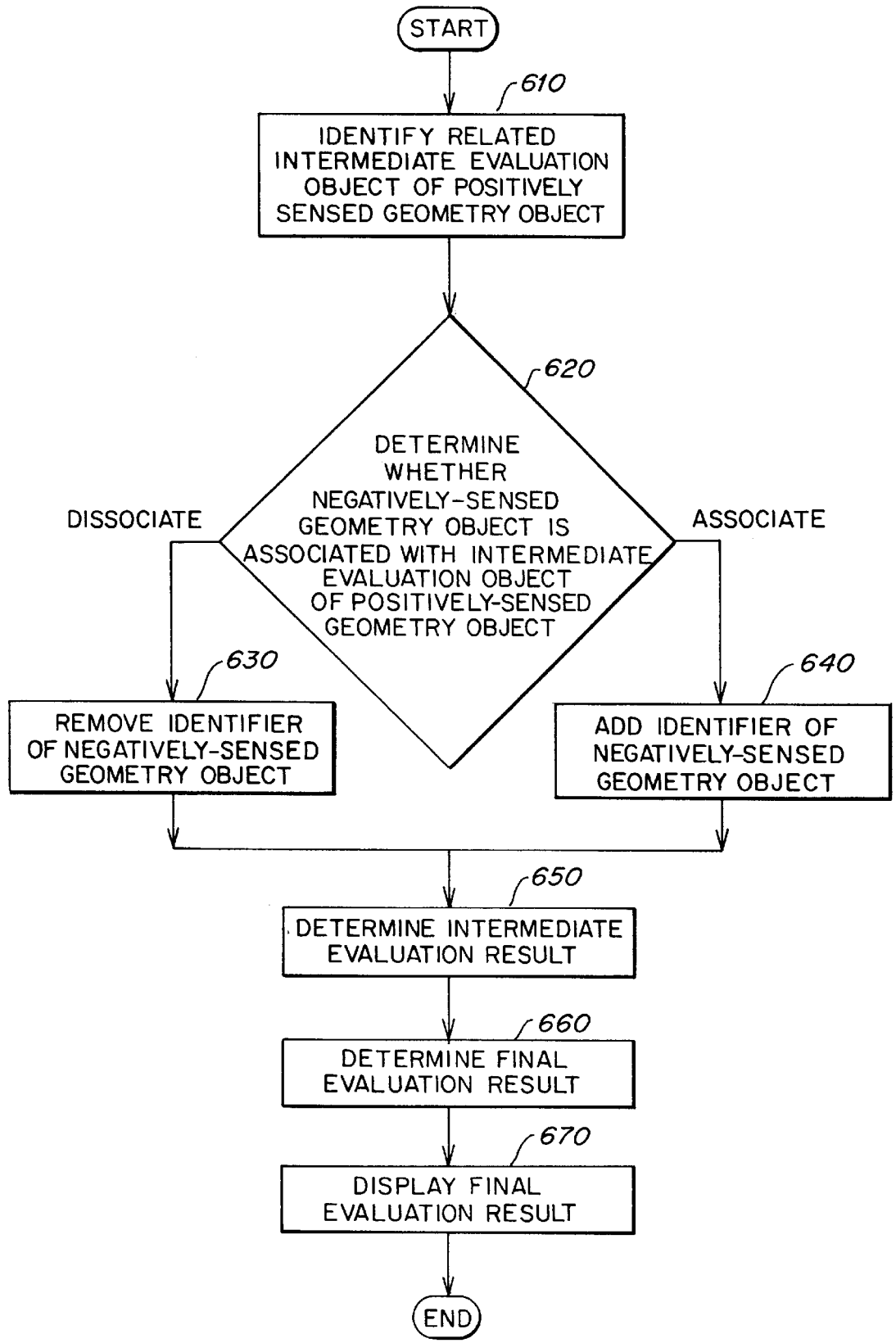
FIG. 7 is a flowchart of an association/dissociation adjustment routine, according to another embodiment of the present invention that performs automatic trimming on geometric primitives when two geometric primitives are selectively associated or disassociated.

FIG. 7 is a flowchart illustrating one implementation of an association/dissociation adjustment routine that adjusts whether the automatic trimming module of the present invention will trim based upon the interaction of two oppositely-sensed geometric primitives. In particular, this association/dissociation adjustment routine provides the capability to the user of associating or dissociating a selected negatively-sensed geometric primitive from a selected positively-sensed geometric primitive with which it may overlap in the 2D sketcher plane. As mentioned above, it should be understood that this flowchart is provided merely for illustrative purposes, and that numerous other implementations are possible.

The association/dissociation adjustment routine of FIG. 7 is called by the sketcher when two oppositely-sensed geometric primitives are selected by a user, and the user specifies that their interaction is to be changed. The association/dissociation adjustment routine is passed the object identifiers of the geometry objects that define the two geometric primitives whose interaction is to be changed. In step 610, the association/dissociation adjustment routine uses the relationship table to identify the intermediate evaluation object corresponding to the positively-sensed geometric primitive passed to the routine when it is called. The routine then proceeds to step 620, wherein a determination is made as to whether the negatively-sensed and positively-sensed geometric primitives are currently associated. In the implementation of the routine illustrated in FIG. 7, this determination is made by determining whether the negatively-sensed primitive is included in the list of associated negatively-sensed primitives stored in the intermediate evaluation object corresponding to the positively-sensed geometric primitive.

When it is determined at step 620 that the negatively and positively-sensed geometric primitives are associated, the association/dissociation adjustment routine proceeds to step 630, wherein the geometric primitives are dissociated. In the implementation shown, the identifier corresponding to the negatively-sensed geometric primitive is removed, in step 630, from the list of associated negatively-sensed geometric primitives in the intermediate evaluation object corresponding to the positively-sensed geometric primitive. The routine then proceeds to step 650, wherein the boolean operation evaluator is called to determine the intermediate evaluation result of the intermediate evaluation object corresponding to the positively-sensed geometric primitive. The boolean operation evaluator is passed the identifier of the positively-sensed geometric primitive and all the negatively-sensed geometric primitives still associated with it, performs a 2D boolean subtraction of all those negatively-sensed geometric primitives from the positively-sensed geometric primitive, and stores the intermediate evaluation result in the intermediate evaluation object.

The routine then proceeds to step 660, wherein the boolean operation evaluator is called to evaluate the union of all of the intermediate evaluation results in the design, including the updated intermediate evaluation result that was generated in step 650 as a result of the dissociation. The final evaluation result is stored in the final evaluation object. The association/dissociation adjustment routine then proceeds to step 670, wherein the display update module is called to display the final evaluation result, and the routine then terminates.

When the association/dissociation adjustment routine determines at step 620 that the negatively and positively-sensed geometric primitives passed to it are not currently associated, the routine proceeds to step 640, wherein action is taken to associate these primitives. In the implementation shown, an identifier corresponding to the negatively-sensed geometric primitive is added, in step 640, to the list of associated negatively-sensed geometric primitives in the intermediate evaluation object corresponding to the positively-sensed geometric primitive. The association/dissociation adjustment routine then proceeds to step 650, wherein the boolean operation evaluator is called to determine the intermediate evaluation result of the intermediate evaluation object corresponding to the positively-sensed geometry object. The boolean operation evaluator is passed the identifier of the positively-sensed geometric primitive and all the negatively-sensed geometric primitives associated with it, performs a 2D boolean subtraction of all those negatively-sensed geometric primitives from the positively-sensed geometric primitive, and stores the intermediate evaluation result in the intermediate evaluation object.

The routine then proceeds to step 660, wherein the boolean operation evaluator is called to evaluate the 2D union of all of the intermediate evaluation results in the design, including the updated intermediate evaluation result that is generated as a result of the new association in step 650. The final evaluation result is stored in the final evaluation object. The association/dissociation adjustment routine then proceeds to step 670, wherein the display update module is called to display the final evaluation result, and the routine then terminates.

As should be appreciated from the foregoing, the association/dissociation adjustment routine selectively associates and dissociates the selected negatively-sensed geometric primitive from only the selected positively-sensed primitive, without affecting the interaction and automatic trimming of these primitives with the other primitives in the design. Furthermore, the exemplary association/dissociation adjustment routine shown in FIG. 7 is advantageous in that when the association of two geometric primitives is adjusted, the entire design need not be recalculated. Rather, the adjustment routine does not determine any intermediate evaluation results that reflect the interaction of the selected primitives with any others, or of two un-selected primitives, thereby saving computation time and resources.

Figure 8:
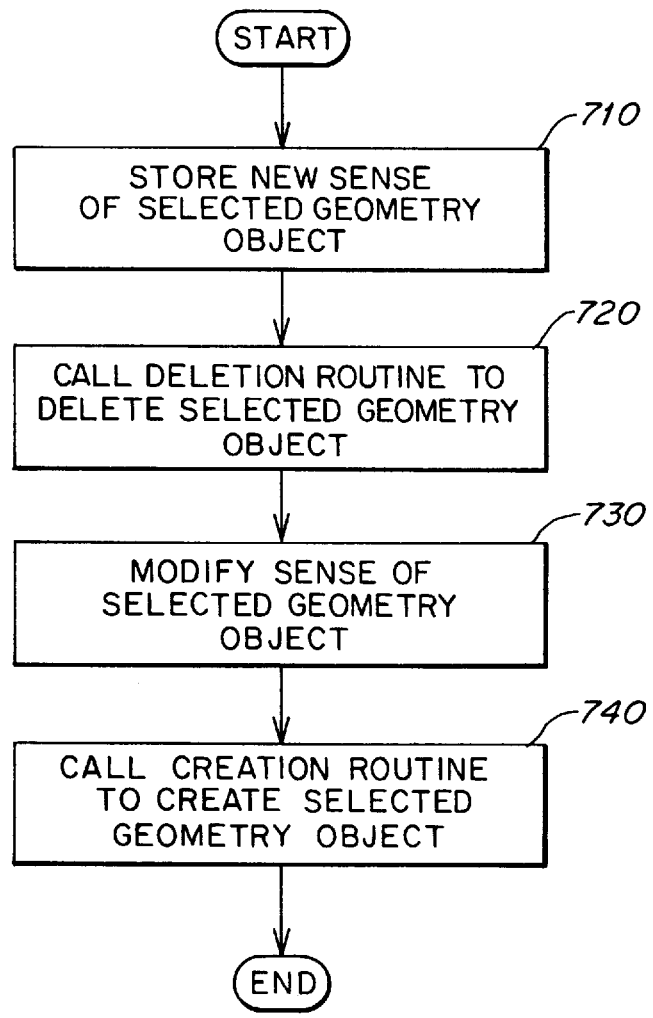
FIG. 8 is a flowchart of a change sense routine that changes the sense of a selected geometric primitive according to another aspect of the present invention.

In one embodiment of the invention, the automatic trimming module provides the user with the capability of changing the sense of a geometric primitive that had previously been created, and of automatically trimming the new design that results from the change. A routine to implement the sense change is illustrated in FIG. 8. In this embodiment, use is made of the creation routine of FIG. 4 and the deletion routine of FIG. 5, since the changing of the sense of a primitive can be implemented by simply deleting the primitive having the old sense, and then adding the primitive back into the design with the new sense. It should be understood that this flowchart is provided merely for illustrative purposes, and that numerous other implementations are possible. Furthermore, since the user can individually delete the old primitive and add the new primitive to the design using sketcher commands, the provision of a separate command to change the sense of a primitive is not mandatory.

As shown in FIG. 8, the sense change routine is called by the sketcher when the user desires to change the sense of a selected geometric primitive in the model. The change sense routine is passed the object identifier of the selected geometric primitive. In step 710, the sense change routine queries the geometry object that defines the geometric primitive to determine its old sense, stores the new sense of the selected geometric primitive, and then proceeds to step 720. In step 720, the sense change routine calls the deletion routine and passes to it the object identifier of the selected geometric primitive. The deletion routine deletes the selected geometry object from the trimmed representation of the design as described in FIG. 5. As should be appreciated the foregoing description of FIG. 5, when the deletion routine removes a geometric primitive from the design, it removes only the automatic trimming module's knowledge of that geometric primitive; it does not remove the underlying geometric primitive from the CAD/CAM system.

After step 720, the sense change routine proceeds to step 730, wherein the sense of the geometry object defining the selected geometric primitive is modified to the new sense stored in step 710. The routine then proceeds to step 740, wherein the creation routine of FIG. 4 is called. The sense change routine passes the object identifier of the selected geometric primitive to the creation routine. The creation routine adds the selected geometric primitive back into the trimmed representation with its new sense, in the manner described in FIG. 4, and updates the display accordingly with the new automatically trimmed result. When control is returned to the sense change routine, the sense change routine simply terminates.

In the examples discussed above, the concept of sense has been combined with the use of a 2D boolean operation to automatically trim primitives in two dimensions. It should be understood that the invention is not limited to trimming in two dimensions and that the techniques of the present invention can also be used to directly trim 3D objects. For example, objects in the 3D model can be assigned a sense, and they can be automatically trimmed using the 3D boolean operation evaluator available in many CAD/CAM systems, or with a special purpose trimming engine as discussed above.

Figure 9A:
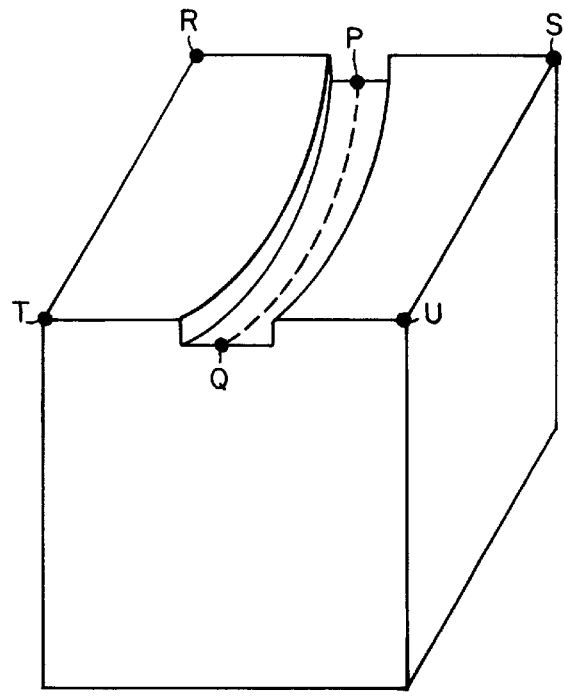
FIGS. 9a–9b illustrate the automatic trimming of an open planar geometric primitive having an offset according to further aspect of the present invention.
Figure 9B:
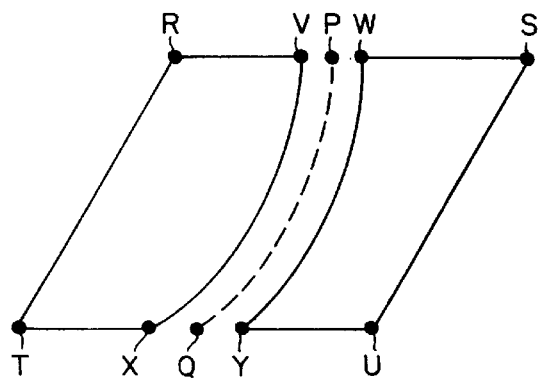
Figure 10A:
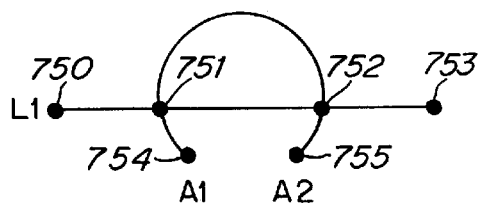
FIGS. 10a–10c illustrate the automatic trimming of an open planar geometric primitive according to another aspect of the present invention.
Figure 10B:
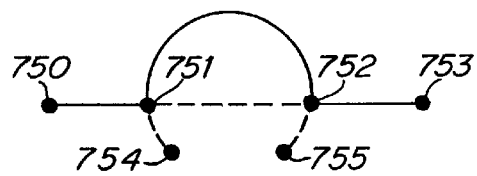
Figure 10C:
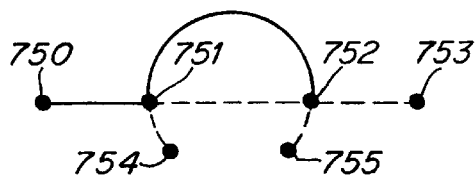
Figure 10D:
Figure 10E:
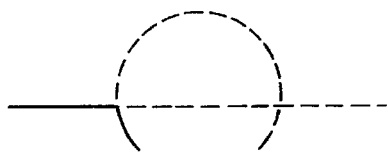
Figure 10F:
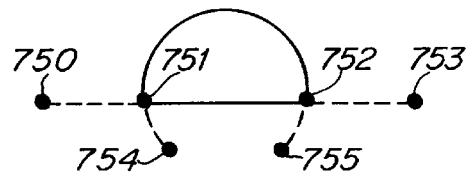

In the examples discussed above, the concept of sense has been used to automatically trim closed planar geometric primitives. However, in one embodiment of the present invention, the concept of sense can also be used to automatically trim open planar geometric primitives that interact in the 2D sketcher plane with other geometric primitives. According to this embodiment, the user can specify that a particular open planar geometric primitive have a user-selected offset having a specified sense. For example, if a user desired to model a box-shaped 3D solid with an arcuate groove removed from it as shown in FIG. 9*a*, the user can, in the 2D plane of the sketcher shown in FIG. 9*b*, create arc PQ, and designate that it have a particular offset shown by arcs VX and WY. Further, the user can specify that arc PQ have a negatively-sensed offset. The interaction of the negatively-sensed offset of arc PQ with rectangle RSTU, when automatically trimmed by the automatic trimming module, results in the geometry illustrated in FIG. 9*b*. Using conventional 3D modeling commands supported by the CAD/CAM system, the user can assign a thickness to arc PQ to model a groove in face RSTU of the 3D object depicted in FIG. 9*a*. Accordingly, by assigning a negative sense to the offset of arc PQ, the automatic trimming module will automatically trim the resulting geometry to obtain the result illustrated by the solid lines in FIG. 9*b*.

In the embodiments of the present invention described above, the concept of sense has been used in conjunction with a boolean operation evaluator to perform auto trimming. However, it should be understood that the present invention is not limited in this respect, and that the concept of sense can be used to perform automatic trimming independent of the use of a boolean operation evaluator. Furthermore, the concept of sense is broader than simply defining a positive, negative or neutral indicator for use with a boolean operation evaluator. At the highest level, the concept of sense includes the assigning to a geometric primitive of one or more attributes that can be used by any automatic trimming engine (e.g., the boolean operation evaluator in the example above) to perform automatic trimming when the geometric primitive interacts with others in the design. Furthermore, the sense attributes assigned to a geometric primitive need not be explicitly specified by the user, and may be assigned by the system based upon the particular nature of the geometric primitive, or the manner in which it was created. The concept of sense employed by the present invention includes the assigning, either by the user or the system automatically, of one or more attributes to a geometric primitive that can be used by an automatic trimming engine to infer the manner in which the user would like the design to be trimmed when the primitive interacts with others in the design.

For example, referring to the illustration shown in FIGS. 10*a–f*, both the line primitive L1 and the arc primitive A1 A2 could have one or more sense attributes that could be used by an automatic trimming engine to infer the manner in which the user would like the geometry to be formed by the trimming operation. For example, the line L1 could include a sense attribute indicating the direction that the cursor moved during its creation, i.e., either from end point 750 to end point 753 or vice versa. It should be recognized that such a sense attribute could be assigned automatically by the system, without requiring any explicit input from the user, The automatic trimming engine could then be implemented to infer, for example, that if the line L1 were formed moving in the direction from end point 750 to end point 753, the trimmed result shown in FIG. 10*b* was desired. Conversely, the automatic trimming engine could infer that if the line were formed in the opposite direction, i.e., with the cursor moving from end point 753 to end point 750, the trimmed result shown in FIG. 10*f* was desired by the user.

The example described above is provided merely for illustrative purposes, and is not intended to be comprehensive. However, this example is useful in demonstrating that the concept of sense is not limited to positive, negative and neutral characteristics that can interact with a boolean operator evaluator. Rather, the concept can more broadly be used to define one or more attributes of a geometric primitive that can be used by an automatic trimming engine to infer the manner in which the user intends the geometry to be trimmed when the primitive interacts with others. Moreover, the concept of sense can be extended from 2D geometric primitives to 3D geometries, with or without the use of a boolean operation evaluator. For example, the concept of sense can be used to define one or more attributes of a 3D geometry that can be used by an automatic trimming engine to infer the manner in which the user would like the design to be trimmed when the 3D geometry interacts with other 3D geometries in the design.

According to another embodiment of the present invention, automatic trimming can also be performed on two or more open planar geometric primitives that interact in the 2D plane of the sketcher without employing the concept of sense or the routines discussed above. As should be appreciated, numerous trimmed results are possible for two or more open planar geometric primitives that interact in the 2D sketcher plane. For example, as described above with reference to FIGS. 10*a–f*, there are many possible trimmed results for the interaction of line L1 with arc A1A2, of which FIGS. 10b–10f depict only a limited subset of the possibilities. According to this embodiment of the invention, a protocol is developed so that design actions taken by a user will control the manner in which trimming of the various combinations of interacting primitives are performed. Once the user learns these protocols, he can take appropriate design actions to cause the system to automatically perform the desired trimming.

Figure 11A:
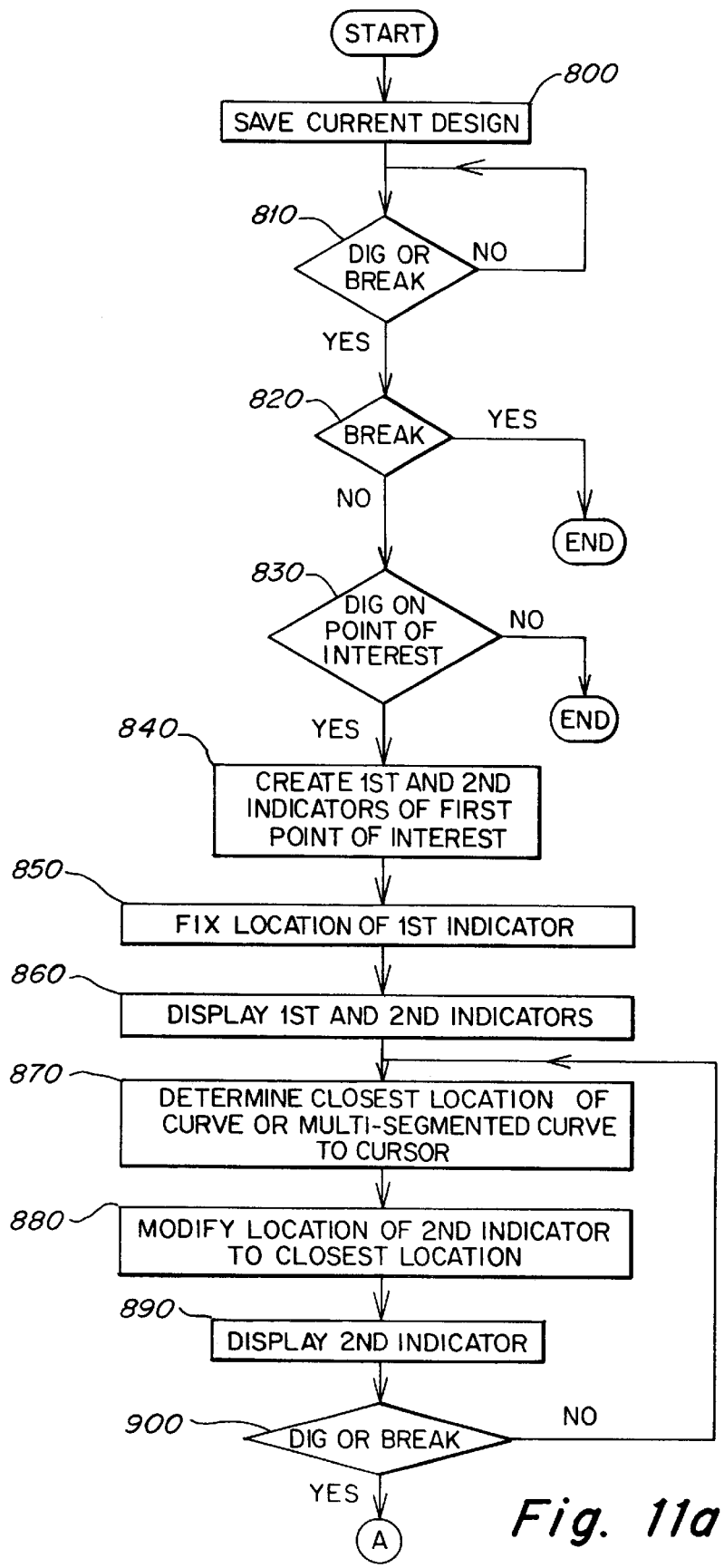
FIGS. 11a–11b are a flowchart of an automatic trimming routine, according to another embodiment of the present invention, that is capable of performing automatic trimming between two open curves or multi-segmented objects, as well as between an open curve and a closed curve.
Figure 11B:
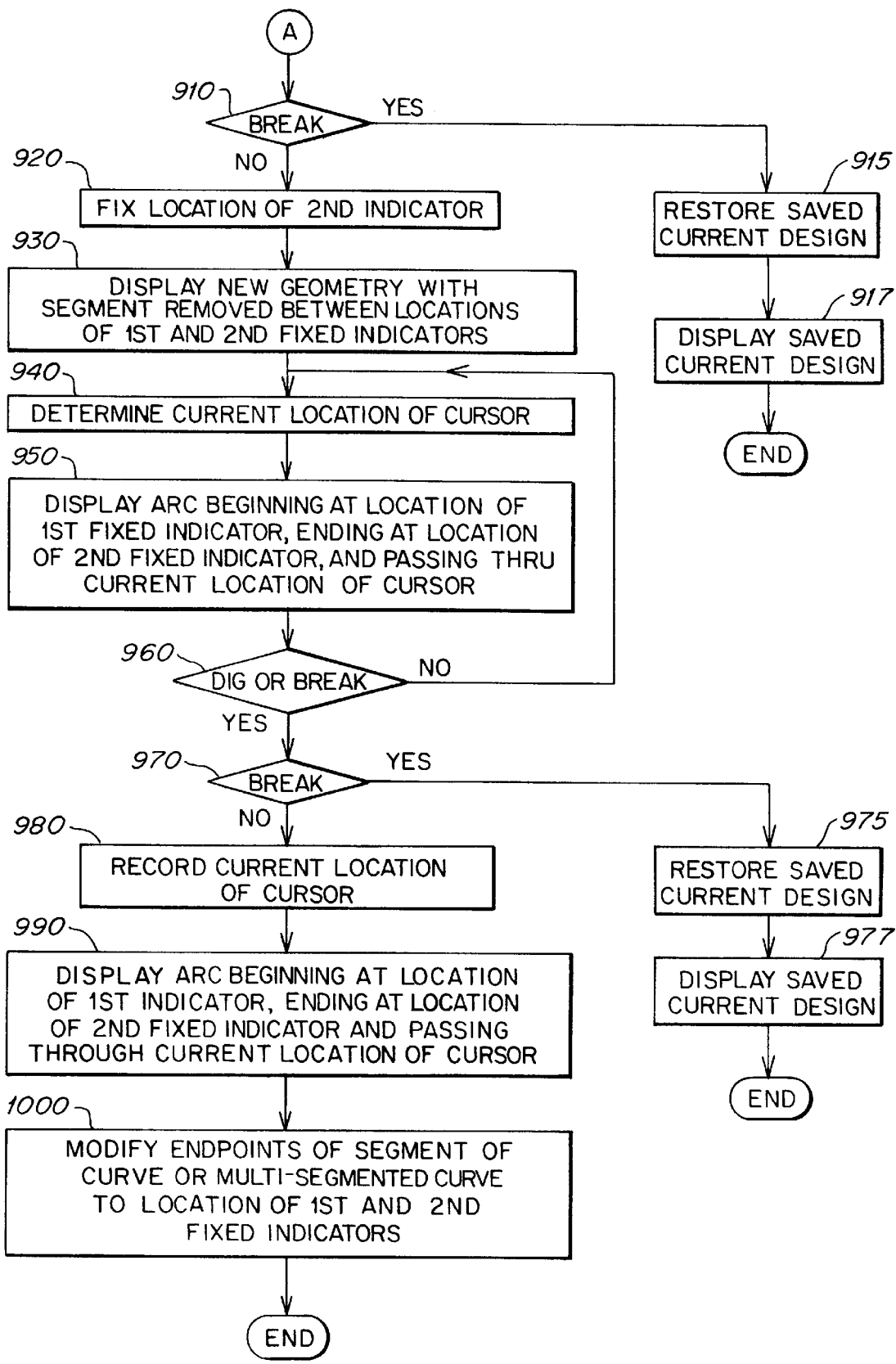

FIGS. 11a–b are a flowchart illustrating one exemplary implementation of the process of the present invention for automatically trimming an open planar geometric primitive, for example an arc, that interacts with a curve or multi-segmented curve. As used in this application, the term curve includes curves that are straight (e.g., lines), as well as curves that are arcuate in shape (e.g., an arc, a spline), and the term multi-segmented curve includes geometries formed by a collection of inter-connected curves. The term "dig" or "dij" is a term of art signifying an event, typically performed on a pointing device (e.g., a mouse, joystick, or a puck) that is coupled to the CAD/CAM system, by which the user informs the system that he/she desires the current position of the cursor to be used for a particular purpose, the particular purpose having a predetermined meaning that is dependent on the context of the design action the user is currently performing. The term "break" is used to denote some action, performed by the user on an input device that is coupled to the CAD/CAM system, by which the user informs the system that the current action he/she is performing is to be aborted. In addition, the term point of interest is used to denote a point located on a curve or multi-segmented curve.

As should be appreciated, CAD/CAM systems may support a number of different paradigms for creating an arc. An arc can be defined by a start point of the arc, an end point of the arc, a direction of rotation of the arc (e.g., clockwise or counter clockwise from the start point to the end point), and one of either a radius of the arc, or the center point of the arc, as one can be necessarily determined from the other. The embodiment of the present invention illustrated in FIGS. 11a–b is adapted to trim arcs created using a particular paradigm. When the arc is to be trimmed with a curve or multi-segmented curve, the first cursor location where the user digs determines the start point of the arc and must be placed on the curve or multi-segmented curve by the user. The second cursor location where the user digs determines the end point of the arc and is constrained by the routine to be on the curve or multi-segmented curve. The third cursor location determines the radius of the arc. In contrast, when an arc is created with a first dig at a first cursor location that is not on the curve or multi-segmented curve, the routine will not perform any trimming as a result of the arc's creation. Such an arc can be created using the same paradigm as those created on the curve or multi-segmented curve, or any other paradigm supported by the CAD/CAM system.

In FIGS. 11a–b, the open planar automatic trimming routine is called by the sketcher when a create arc command is received from the user in the sketcher. In step 800, the routine saves the current design, in case the routine is aborted before completion, and then proceeds to step 810. In step 810, a determination is made as to whether the user has performed a dig or a break. When neither a dig nor a break is detected, the routine returns to step 810 until either a dig or a break is performed. When at step 810 a dig or a break is detected, the routine proceeds to step 820, wherein a determination is made as to whether the user action was a break. When it is determined at step 820 that the user has performed a break, the routine simply terminates, as no modification of the design has been performed by the open planar trimming routine.

In contrast, when it is determined at step 820 that a break was not performed by the user, then the routine recognizes that a dig must necessarily have been performed, and proceeds to step 830. In step 830, a determination is made as to whether the user has performed a dig at a location that is on a geometric primitive of the curve, or on one of the geometric primitives forming the multi-segmented curve. When the routine determines, at step 830, that a dig has not been performed on such a point of interest, the routine terminates, as it is determined that no automatic trimming is necessary.

Alternatively, when it is determined at step 830 that the dig has been performed on a point of interest, the routine proceeds to step 840, wherein first and second indicators of this first point of interest are created. The first and second indicators respectively will represent the two ends of the arc being created. In step 850, the routine fixes the location of the first indicator at the location determined by the first dig, and proceeds to step 860. In step 860, the routine calls a display module to display the first and second indicators. The second indicator is not fixed in any position, but can move along the curve or multi-segmented curve as discussed below.

In step 870, the routine determines a closest location on the curve or multi-segmented curve to the present position of the cursor, and then proceeds to step 880. In step 880, the routine modifies the location of the second indicator to the closest location determined in step 870, and proceeds to step 890. In step 890, the display module is called to display the second indicator. Accordingly, the first and second indicators are displayed by the display module, with the first indicator being displayed at the location fixed in step 850, and the second indicator being displayed at the location modified in step 880.

In step 900, a determination is made as to whether the user has performed a dig or a break. When neither a dig nor a break has been performed by the user, the routine returns to step 870, and continually performs steps 870, 880, and 890 until either a dig or a break is detected. As a result, the display of the second indicator is continually updated to reflect any movement of the cursor in the sketcher. When a dig or a break is detected at step 900, the routine proceeds to step 910, wherein a determination is made as to whether a break has been performed. When it is determined that the user has performed a break indicating that the create arc process has been abandoned, the routine proceeds to step 915, wherein the routine restores the current design that was saved in step 800. After restoring the saved current design, the routine proceeds to step 917, wherein the display module is called to display the restored design, and the routine terminates.

Alternatively, when it is determined at step 900 that a break was not performed by the user, then the routine recognizes that a dig must necessarily have been performed, and the routine proceeds to step 920. In step 920, the routine fixes the location of the second indicator, and then proceeds to step 930, wherein the display module is called to display a new partially-trimmed geometry. The new geometry that is displayed represents the curve or multi-segmented curve with the segment between the locations of the first indicator and the second indicator removed. As with the embodiments of the present invention discussed above, the new geometry can be displayed in solid line form, with the underlying geometric primitives being displayed in dotted line form.

In step 940, the routine determines the current location of the cursor, and then proceeds to step 950. In step 950, the routine calls the display module to display an arc beginning at the location of the first fixed indicator and ending at the location of the second fixed indicator, and passing through the current location of the cursor. In step 960, a determination is made as to whether the user has performed a dig or a break. When neither a dig nor break has been performed by the user, the routine returns to step 940, and performs steps 940 and 950 repeatedly until either a dig or a break is detected. As a result, the displayed arc rubber-bands in the 2D plane of the sketcher corresponding to the movement of the cursor in the sketcher.

When a dig or a break is detected at step 960, the routine proceeds to step 970, wherein a determination is made as to whether a break has been performed. When it is determined at step 970 that the user has performed a break indicating that the process should be abandoned, the routine proceeds to step 975, wherein the routine restores the current design that was saved in step 800. After restoring the saved design, the routine proceeds to step 977, wherein the display module is called to display the restored design, and then terminates.

Alternatively, when it is determined at step 970 that a break was not performed by the user, then the routine recognizes that a dig must necessarily have been performed, and the routine proceeds to step 980. In step 980, the routine records the current location of the cursor, and then proceeds to step 990. In step 990, the display module is called to display the trimmed geometry. The trimmed geometry that is displayed represents the curve or multi-segmented curve having the segment between the locations of the first indicator and the second indicator removed, and having an arc that begins at the location of the first fixed indicator, ends at the location of the second fixed indicator, and passes through the location of the cursor that was recorded in step 980. As with the embodiments of the present invention discussed above, the new geometry can be displayed in solid line form, with the underlying geometric primitives being displayed in dotted line form. The routine then proceeds to step 1000, wherein the endpoints of the segment of the curve or multi-segmented curve are modified to the locations of the first and second fixed indicators, and then terminates.

As should be appreciated by the foregoing, the open planar automatic trimming routine described above is but one illustration of a routine that can be used to automatically trim the intersection of two or more open planar geometries. Adaptations of this routine can be made to support the automatic trimming of a open planar curve (e.g., a line or an arc) with a closed planar geometry (e.g., a circle, square, polygon, or other closed multi-segmented geometry). For example, if the user created a rectangle, and then desired to create an arc that automatically trims the rectangle, the user's first dig, could be required to be placed on a point of interest of the rectangle, and could determine the start point of the arc. The user's second dig could then determine the end point of the arc, with the end point of the arc being placed on a point of interest that is closet to the cursor position where the user performed the second dig. Then, dependent on the cursor location of the user's third dig, an automatically trimmed representation could be determined and displayed.

Figure 12:
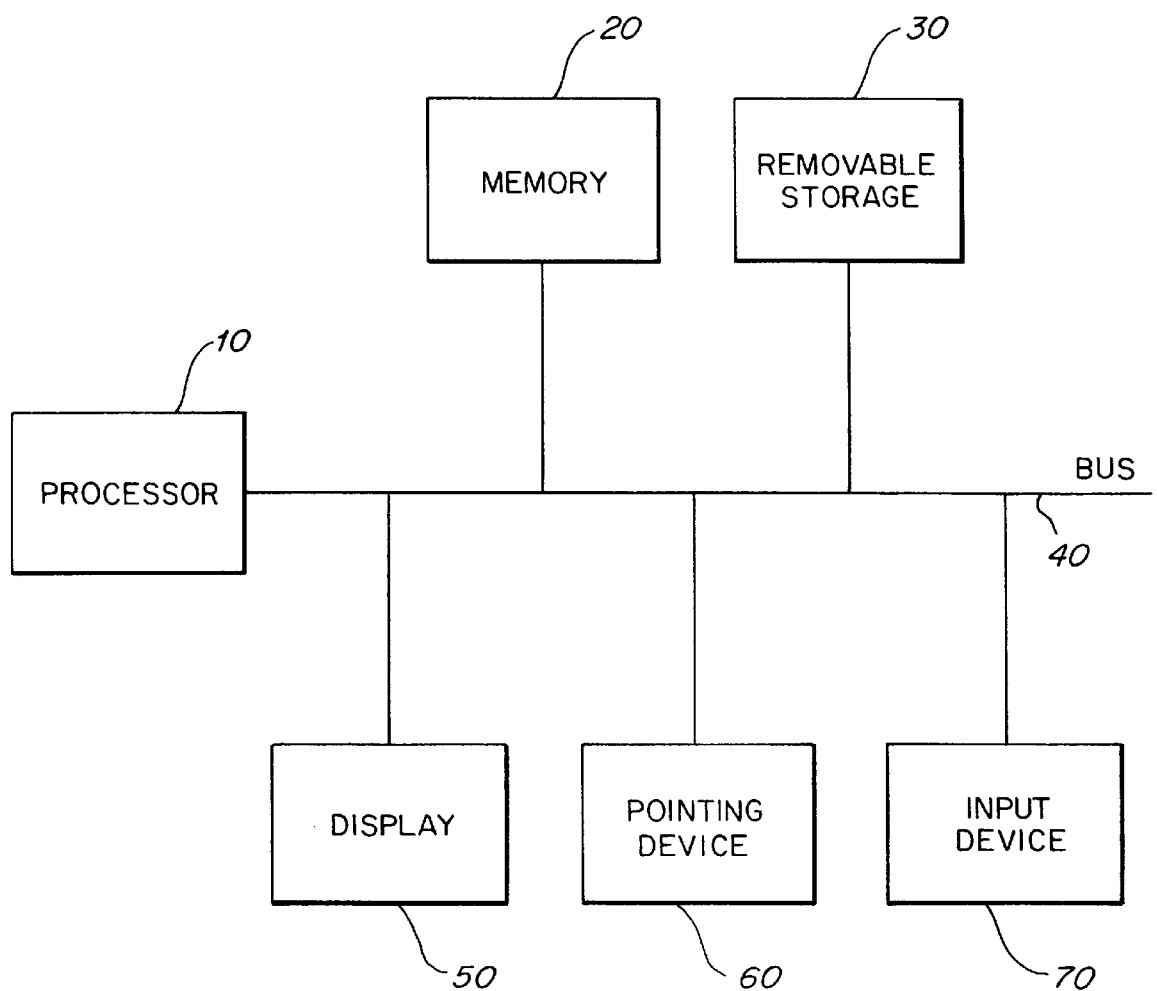
FIG. 12 illustrates an example of a CAD/CAM system on which the present invention can be implemented.

An illustrative CAD/CAM system with which the present invention can be used is shown in FIG. 12. The system includes a processor 10, a memory 20, a removable storage device 30, a display 50, a pointing device 60 and an input device 70, all coupled together via a bus 40. It should be understood that this system is shown merely for illustrative purposes, and that the present invention is not limited to use with a system having this specific configuration, as other configurations are possible. For example, in other CAD/CAM system configurations, the pointing device 60 can be coupled to the bus 40 via the input device 70 or display 50. The memory 20 may consist of memory devices such as hard disk drives or optical disk drives, RAM, ROM, or other memory devices and combinations thereof. The input device 70 may include a keyboard that allows a user to interact with the system. The pointing device 60 may, for example, be a puck, joystick, trackball, or mouse. The display 50 is a CRT screen, or similar device, that allows the user to visualize his/her interactions with the CAD/CAM system. The removable storage device 30 may be a CD-ROM drive, a tape drive, or a diskette drive. The removable storage device 30 is typically used to load, backup, or update the operating system of the CAD/CAM system, and to load application software, including the CAD/CAM software, from a computer-readable medium.

CAD/CAM software, including code that implements the 2D sketcher, the 2D boolean operation evaluator and the automatic trimming module of the present invention, may be stored on some type of removable computer-readable storage media such as a CD-ROM, tape, or diskette. The software can be copied to a permanent form of storage media on the CAD/CAM system (e.g., a hard disk) to preserve the removable storage media for back-up purposes. When the CAD/CAM software of the invention is actually in use, the software is generally at least partially stored in RAM, and is executed on the processor 10, such that the processor 10 is programmed to perform the methods of the routines described by the flowcharts of FIGS. 4–8 and 11a–b of the present application.

Having thus described at least one illustrative embodiment of the invention, various alterations, modifications, and improvements will readily occur to those skilled in the art. Moreover, the concepts described herein can be extended from the 2D plane of the sketcher to the 3D space of the CAD/CAM system. For example, automatic trimming can be performed based on the interaction of two or more 3D solids, and can be based on the concept of sense or a defined protocol. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A computer readable medium encoded with a program that, when executed on a computer aided design (CAD) system, performs a method of trimming a design that is formed on the CAD system by an interaction of a first model primitive and a second model primitive, the CAD system including a sketcher that creates the first and second model primitives based upon design actions taken by a user, a display and a display system that displays the first and second model primitives on the display, the method comprising the steps of:

automatically creating a trimmed geometry representing a trimmed interaction of the first model primitive and the second model primitive responsive to creation of the second model primitive; and automatically displaying the trimmed geometry on the display.

2. The computer readable medium of claim 1, wherein the step of automatically creating includes steps of:

assigning at least one attribute to the second model primitive; and passing the first and second model primitives to a trimming engine that automatically creates the trimmed geometry based on the at least one attribute.

3. The computer readable medium of claim 2, wherein the step of automatically displaying the trimmed geometry includes displaying the trimmed geometry superimposed on the first and second model primitives.

4. The computer readable medium of claim 2, wherein the step of assigning includes a step of assigning the at least one attribute to the second model primitive when the second model primitive is created.

5. The computer readable medium of claim 2, wherein the method further comprises steps of:

receiving, in response to user input, a signal to change the at least one attribute assigned to the second model primitive;

changing the at least one attribute assigned to the second model primitive;

passing the first and second model primitives to the trimming engine to automatically create a new trimmed geometry; and automatically displaying the new trimmed geometry on the display.

6. The computer readable medium of claim 2, wherein the step of assigning the at least one attribute to the second model primitive includes a step of inferring the at least one attribute based upon the design actions taken by the user which create the second model primitive.

7. The computer readable medium of claim 1, wherein the step of automatically creating includes steps of:

assigning a sense to each of the first and second model primitives, each sense being selected from a group including positive and negative sense; and determining the trimmed interaction of the first model primitive and the second model primitive using the sense of the first and second model primitives.

8. The computer readable medium of claim 7, wherein the step of determining the trimmed interaction further uses a temporal order of creation of the first and second model primitives in determining the trimmed interaction of the first model primitive and the second model primitive.

9. The computer readable medium of claim 7, wherein the step of determining includes determining the trimmed interaction of the first model primitive and the second model primitive to be a boolean union of the first model primitive and the second model primitive when the senses of the first and second model primitives are both positive.

10. The computer readable medium of claim 7, wherein the step of determining includes determining the trimmed interaction of the first model primitive and the second model primitive to be a boolean subtraction of the second model primitive from the first model primitive when the sense of the first model primitive is positive and the sense of the second model primitive is negative.

11. The computer readable medium of claim 7, wherein the group from which each sense is selected further includes a neutral sense, and wherein the step of determining the trimmed interaction of the first model primitive and the second model primitive includes a step of determining that the second model primitive does not interact with the first model primitive when the sense of the first model primitive is neutral.

12. The computer readable medium of claim 7, wherein the method further comprises a step of retaining the first model primitive and the second model primitive after the trimmed geometry has been created.

13. The computer readable medium of claim 7, wherein the group from which each sense is selected further includes a neutral sense, and the step of automatically creating further includes a step of assigning one of positive, negative, and neutral sense to the second model primitive when the second model primitive is a closed planar model primitive.

14. The computer readable medium of claim 7, wherein the step of determining includes steps of:

calculating, for each positively-sensed model primitive in the design, a respective intermediate evaluation that corresponds to the positively-sensed model primitive, the respective intermediate evaluation being a boolean subtraction from the corresponding positively-sensed model primitive of each negatively-sensed model primitive associated with the corresponding positively-sensed model primitive, and calculating a final evaluation based on an interaction of each of the respective intermediate evaluations.

15. The computer readable medium of claim 14, wherein the step of calculating the final evaluation includes a step of calculating a boolean union of each of the intermediate evaluations.

16. The computer readable medium of claim 14, wherein the step of automatically creating further includes, for each positively-sensed model primitive in the design, a step of associating each negatively-sensed model primitive in the design with the positively-sensed model primitive at creation of the positively-sensed model primitive.

17. The computer readable medium of claim 14, wherein the step of assigning the sense to the first and second model primitives assigns positive sense to the first model primitive and negative sense to the second model primitive, the method further comprising steps of:

receiving, in response to user input, a signal to change the trimmed interaction of the first model primitive and the second model primitive; and dissociating, in response to the step of receiving, the second model primitive from the first model primitive.

18. The computer readable medium of claim 14, wherein the step of assigning the sense to the first and second model primitives assigns positive sense to the first model primitive and negative sense to the second model primitive, the method further comprising steps of:

receiving, in response to user input, a signal to change the trimmed interaction of the first model primitive and the second model primitive; and associating, in response to the step of receiving, the second model primitive with the first model primitive.

19. The computer readable medium of claim 7, wherein the step of determining includes determining the trimmed interaction of the first model primitive with the second model primitive to be a boolean subtraction of the second model primitive from the first model primitive when the sense of the first model primitive is positive, the sense of the second model primitive is negative, and the first model primitive is created before the second model primitive.

20. The computer readable medium of claim 19, wherein the step of determining includes a step of determining that the first model primitive does not interact with the second model primitive when the sense of the first model primitive is positive, the sense of the second model primitive is negative, and the first model primitive is created after the second model primitive.

21. The computer readable medium of claim 1, wherein the method further comprises a step of retaining the first model primitive and the second model primitive after the trimmed geometry has been created.

22. The computer readable medium of claim 21, wherein the step of automatically displaying the trimmed geometry includes displaying the trimmed geometry superimposed on the first and second model primitives.

23. The computer readable medium of claim 1, wherein the method further comprises steps of:
   automatically creating, in response to a user initiated design action that modifies a portion of the design that includes the first model primitive, a new trimmed geometry representing a new trimmed interaction of the first model primitive and the second model primitive; and
   automatically displaying the new trimmed geometry on the display.

24. The computer readable medium of claim 1, wherein the step of automatically displaying the geometry includes displaying the geometry superimposed on the first and second model primitives.

25. A computer aided design (CAD) system that includes a sketcher that creates a first model primitive and a second model primitive based upon design actions taken by a user, a display and a display system that displays the first and second model primitives on the display, an interaction of the first and second model primitives forming a design, the CAD system comprising:
   first means, responsive to creation of the first model primitive, for automatically creating a trimmed geometry representing a trimmed interaction of the first model primitive and the second model primitive; and
   second means for automatically displaying the trimmed geometry on the display.

26. The CAD system of claim 25, further comprising:
   means, responsive to a user initiated design action that modifies a portion of the design that includes the first model primitive, for causing the first means to automatically create a new trimmed geometry representing a new trimmed interaction of the first model primitive and the second model primitive.

27. The CAD system of claim 25, wherein the first means includes:
   means for assigning an attribute to each of the first and second model primitives; and
   means for determining the trimmed interaction of the first model primitive and the second model primitive based upon the attributes assigned to the first and second model primitives.

28. The CAD system of claim 27, wherein the means for determining includes means for performing boolean operations on the first and second model primitives.

29. The CAD system of claim 27, wherein the first means further includes means for automatically creating a new trimmed geometry representing a new trimmed interaction of the first model primitive and the second model primitive in response the user changing the attribute assigned to the first model primitive.

30. The CAD system of claim 27, wherein the second means includes means for automatically displaying the trimmed geometry superimposed on the first and second model primitives.

31. The CAD system of claim 25, wherein the first means includes:
   means for assigning a sense to the first and second model primitives, each being selected from a group including positive and negative sense; and
   means for determining the trimmed interaction of the first model primitive and the second model primitive based upon the attributes assigned to the first and second model primitives.

32. The CAD system of claim 31, wherein the means for determining further includes means for performing a boolean union of the first model primitive and the second model primitive when the senses of the first and second model primitives are both positive.

33. The CAD system of claim 31, wherein the means for determining further includes means for performing a boolean subtraction of the second model primitive from the first model primitive when the sense of the first model primitive is positive and the sense of the second model primitive is negative.

34. The CAD system of claim 31, wherein the group from which the sense is selected further includes a neutral sense, and wherein the means for determining includes means for determining that the first model primitive does not interact with the second model primitive when the second model primitive is neutral.

35. The CAD system of claim 31, wherein the means for assigning includes means for assigning the sense to the first and second model primitives when the first and second model primitives are created.

36. The CAD system of claim 31, wherein the first means includes means for retaining the first and second model primitives after the trimmed geometry has been created.

37. The CAD system of claim 36, wherein the second means includes means for automatically displaying the trimmed geometry superimposed on the first and second model primitives.

38. The CAD system of claim 31, wherein the group from which the sense is selected further includes a neutral sense, and wherein the means for assigning assigns one of positive, negative, and neutral sense to the first model primitive when the first model primitive is a closed planar model primitive.

39. The CAD system of claim 31, wherein the means for determining includes:
   means for calculating, for each positively-sensed model primitive in the design, a respective intermediate evaluation that corresponds to the positively-sensed model primitive, the respective intermediate evaluation being a boolean subtraction from the corresponding positively-sensed model primitive of each negatively-sensed model primitive associated with the corresponding positively-sensed primitive; and
   means for calculating a final evaluation based on the interaction of each of the intermediate evaluations.

40. The CAD system of claim 39, wherein the means for calculating the final evaluation includes means for calculating a boolean union of each of the intermediate evaluations.

41. The CAD system of claim 39, wherein the first means further includes means for associating each negatively-sensed model primitive in the design with each positively-sensed model primitive.

42. The CAD system of claim 41, further comprising:
   dissociating means responsive to input from the user, for dissociating the second model primitive from the first model primitive to change the trimmed interaction of the first model primitive and the second model primitive generated by the means for calculating the final evaluation.

43. The CAD system of claim 25, wherein the first means includes:
   means for inferring and assigning an attribute to the first model primitive based upon the design actions taken by the user which create the first model primitive; and
   means for determining the trimmed interaction of the first model primitive and the second model primitive based upon the attribute assigned to the first model primitive.

44. The CAD system of claim 25, wherein the first means includes means for retaining the first and second model primitives after the trimmed geometry has been created.

45. The CAD system of claim 44, wherein the second means includes means for automatically displaying the trimmed geometry superimposed on the first and second model primitives.

46. A computer readable medium encoded with a program that, when executed on a computer aided design (CAD) system, performs a method of trimming a design that is formed on the CAD system by an interaction of a first model primitive and a second model primitive, the CAD system including a sketcher that creates the first and second model primitives based upon design actions taken by a user, a display and a display system that displays the first and second model primitives on the display, the method comprising the steps of:

assigning a first attribute to the first model primitive and a second attribute to the second model primitive;

determining, in response to the creation of the second model primitive, a trimmed interaction of the first and second model primitives based upon the first and second attributes; and displaying a trimmed geometry representing the trimmed interaction of the first and second model primitives on the display.

47. The computer readable medium of claim 46, wherein the step of assigning the first and second attributes includes a step of assigning a first sense to the first model primitive and a second sense to the second model primitive, the first and second senses each being selected from a group including positive and negative sense.

48. The computer readable medium of claim 47, wherein the step of determining includes determining the trimmed interaction of the first and second model primitives to be a boolean union of the first and second model primitives when the first and second senses are both positive.

49. The computer readable medium of claim 47, wherein the step of determining includes determining the trimmed interaction of the first and second model primitives to be a boolean subtraction of the second model primitive from the first model primitive when the first sense is positive and the second sense is negative.

50. The computer readable medium of claim 47, wherein the group from which each of the first and second senses is selected further includes a neutral sense, and wherein the step of determining the trimmed interaction of the first and second model primitives includes a step of determining the first model primitive does not interact with the second model primitive when the second sense is neutral.

51. The computer readable medium of claim 46, wherein the method further comprises a step of retaining the first model primitive and the second model primitive after the trimmed geometry has been created.

52. The computer readable medium of claim 51, wherein the step of displaying the trimmed geometry includes displaying the trimmed geometry superimposed on the first and second model primitives.

53. The computer readable medium of claim 46, wherein the step of displaying the trimmed geometry includes displaying the trimmed geometry superimposed on the first and second model primitives.

54. The computer readable medium of claim 46, wherein the method further comprises steps of:

determining, in response to a user initiated design action that modifies a portion of the design that includes the first model primitive, a new trimmed interaction of the first and second model primitives based upon the first and second attributes; and displaying the new trimmed geometry representing the new trimmed interaction of the first and second model primitives on the display.

55. A computer readable medium encoded with a program that, when executed on a computer aided design (CAD) system, performs a method of trimming a design that is formed on the CAD system by an interaction of a first model primitive and a second model primitive, the CAD system including a sketcher that creates the first and second model primitives based upon design actions taken by a user, a display and a displays system that displays the first and second model primitives on the display, the method comprising the steps of:

creating, in response to the creation of the second model primitive, a trimmed geometry representing a trimmed interaction of the first and second model primitives;

displaying the trimmed geometry on the display system; and retaining the first and second model primitives after the trimmed geometry is created.

56. The computer readable medium of claim 55, wherein the method further comprises a step of displaying the first and second model primitives along with the trimmed geometry.

57. The computer readable medium of claim 56, wherein the step of displaying the trimmed geometry includes displaying the trimmed geometry superimposed on the first and second model primitives.

58. The computer readable medium of claim 55, wherein the method further comprises a step of:

assigning an attribute to each of the first and second model primitives; and wherein the step of creating includes a step of determining the trimmed interaction of the first and second model primitives based upon the attributes assigned to the first and second model primitives.

59. The computer readable medium of claim 58, wherein the step of assigning the attribute to each of the first and second model primitives includes a step of assigning a sense to each of the first and second model primitives, each sense being selected from a group including positive and negative sense.

60. The computer readable medium of claim 59, wherein the step of determining includes determining the trimmed interaction of the first model primitive and the second model primitive to be a boolean union of the first model primitive and the second model primitive when the senses of the first and second model primitives are both positive.

61. The computer readable medium of claim 59, wherein the step of determining includes determining the trimmed interaction of the first model primitive and the second model primitive to be a boolean subtraction of the second model primitive from the first model primitive when the sense of the first model primitive is positive and the sense of the second model primitive is negative.

62. The computer readable medium of claim 59, wherein the group from which each sense is selected further includes a neutral sense, and wherein the step of determining the trimmed interaction of the first model primitive and the second model primitive includes a step of determining that the first model primitive does not interact with the second model primitive when the sense of the second model primitive is neutral.

63. A computer readable medium encoded with a program that, when executed on a computer aided design (CAD)

system performs a method of trimming design that is formed on the CAD system by an interaction of model primitives, the CAD system including a sketcher that creates the model primitives based upon design actions taken by a user, a display and a display system that displays the model primitives on the display, the method comprising the steps of:

inferring, according to a predetermined protocol, a selected one of a plurality of possible trimmed representations of an interaction of a first model primitive and a second model primitive;

creating a trimmed geometry corresponding to the selected one of the plurality of trimmed representations; and displaying the trimmed geometry on the display.

64. The computer readable medium of claim 63, wherein the predetermined protocol defines a plurality of design actions for the user to follow that uniquely identify the selected one of the plurality of possible trimmed representations.

65. The computer readable medium of claim 63, wherein the predetermined protocol defines a sequence of design actions for the user to follow that uniquely identify the selected one of the plurality of possible trimmed representations.

66. The computer readable medium of claim 63, wherein the method further comprises a step of retaining the first and second model primitives after the trimmed geometry has been created.

67. The computer readable medium of claim 66, wherein the method further comprises a step of displaying the first and second model primitives along with the trimmed geometry.

68. The computer readable medium of claim 67, wherein the step of displaying the trimmed geometry includes displaying the trimmed geometry superimposed on the first and second model primitives.

69. The computer readable medium of claim 63, wherein the step of displaying the trimmed geometry includes a step of displaying the trimmed geometry superimposed on the first and second model primitives.

* * * * *